(12) United States Patent
Murshid et al.

(10) Patent No.: US 8,396,371 B2
(45) Date of Patent: Mar. 12, 2013

(54) ORBITAL ANGULAR MOMENTUM IN SPATIALLY MULTIPLEXED OPTICAL FIBER COMMUNICATIONS

(75) Inventors: Syed H. Murshid, West Melbourne, FL (US); Azhar M. Khayrattee, Melbourne, FL (US)

(73) Assignee: Florida Institute of Technology, Melbourne, FL (US)

( * ) Notice: Subject to any disclaimer, the term of this patent is extended or adjusted under 35 U.S.C. 154(b) by 330 days.

(21) Appl. No.: 12/854,239

(22) Filed: Aug. 11, 2010

(65) Prior Publication Data

US 2011/0150464 A1 Jun. 23, 2011

Related U.S. Application Data

(60) Provisional application No. 61/252,820, filed on Oct. 19, 2009.

(51) Int. Cl.
*H04J 14/04* (2006.01)
*H04B 10/12* (2006.01)

(52) U.S. Cl. .......................................... 398/141; 398/44
(58) Field of Classification Search .................... 398/44, 398/141
See application file for complete search history.

(56) References Cited

U.S. PATENT DOCUMENTS

2003/0174942 A1* 9/2003 Murshid et al. ................. 385/31

* cited by examiner

*Primary Examiner* — Shi K Li
(74) *Attorney, Agent, or Firm* — Joel I. Rosenblatt (57) ABSTRACT

Multiple light beams are launched into a single optical fiber, each respective light beam with a corresponding signal. Each of the respective multi-beams are separated by launching each of the light at a different incidence angle and/or input position, into the optical fiber. In this way, each light beam is able to propagate independently according to its own trajectory inside the fiber. The resultant multi light beams propagate with respective counter cyclical orbital angular momentum with respective helical paths.

20 Claims, 9 Drawing Sheets

| Channel | a<br>81 | b | c | d<br>87 | e<br>85 | f | g | h<br>83 |
|---|---|---|---|---|---|---|---|---|
| All Off | 0 | 0 | 0 | 0 | 0 | 0 | 0 | 0 |
| Only Standard | 1 | 1 | 1 | 1 | 1 | 1 | 1 | 1 |
| Only CW OAM | 0 | 1 | 1 | 1 | 0 | 1 | 1 | 1 |
| Only CCW OAM | 1 | 1 | 1 | 0 | 1 | 1 | 1 | 0 |
| Standard + CW OAM | 1 | 1+ | 1+ | 1+ | 1 | 1+ | 1+ | 1+ |
| Standard + CCW OAM | 1+ | 1+ | 1+ | 1 | 1+ | 1+ | 1+ | 1 |
| (CW + CCW) OAM | 1 | 1+ | 1+ | 1 | 1 | 1+ | 1+ | 1 |
| Standard + (CW + CCW) OAM | 1+ | 1+ | 1+ | 1+ | 1+ | 1+ | 1+ | 1+ |

Fig 3b

ORBITAL ANGULAR MOMENTUM IN SPATIALLY MULTIPLEXED OPTICAL FIBER COMMUNICATIONS

A claim for priority under 35 U.S.C. 120 is made for the filing date of provisional patent application 61/252,820, filed Oct. 19, 2009

FIELD OF INVENTION

Multiplexing multi optical channels of the same or different optical wavelengths, on a single fiber, with counter cyclical orbital angular momentum

BACKGROUND

The subject invention pertains to a method and apparatus for multiplexing in optical fiber communications, for example, as shown and described in U.S. Pat. No. 7,639,909, Method And Apparatus For Spatial Domain Multiplexing In Optical Fiber Communications. As shown therein, multiple light beams, are launched into a single optical fiber, each respective light beam with a corresponding signal. The respective multi-beam excitation and separation in a single optical fiber, as disclosed, is accomplished by launching one or more light beams, each at a different incidence angle and/or input position, into the optical fiber. In this way, each light beam is able to propagate independently according to its own trajectory inside the fiber. As shown and described in U.S. Pat. No. 7,639,909, the projection of the light beam is in an annular ring with a respective radius dependent on the launch angle or skew angle of the light beam into the optical fiber.

SUMMARY OF THE INVENTION

U.S. Pat. No. 7,639,909 and the disclosed invention is incorporated by reference. The invention, as disclosed in U.S. Pat. No. 7,639,909 is a system for producing propagating helical light rays in an optical carrier. It discloses projecting a light ray beam into an optic fiber at an incident angle $\theta_n$ relative to a numerical aperture $\theta$max for the optic fiber.

As shown and disclosed in U.S. Pat. No. 7,639,909, for spatial domain multiplexing (SDM), multiple light beams are projected or launched into a single optical fiber at different respective incident angles, $\theta_n$. As shown in U.S. Pat. No. 7,639,909, using the known physical constraints of the fiber optic, a maximum angle of incidence which is the numerical aperture represented by Sine $\theta_{max}$ may be calculated. Multiple light beams may be projected into the fiber optic at separate respective discrete angles, or incident angles, $\theta_n$ within a numerical aperture $\theta_{max}$. For example, for a numerical aperture $\theta_{max}$=50 degrees and for a respective incidence angle for $\theta_n$ from approximately 0 degrees up to a maximum incidence angle $\theta_n$ equal to $\theta_{max}$, which is the maximum angle of incidence or projection of the light beam into the fiber optic, for $\theta_n$, the variation of conic shapes of output light, appearing in respective annular rings projected on a flat surface, may be observed as respective annular rings of varying radii responsive to the respective incident angle $\theta_n$ of the projected light beam into the optic fiber.

As shown and described in U.S. Pat. No. 7,639,909, the physical output angles for the respective annular rings illuminated on the projected flat surface may be determined and as shown in U.S. Pat. No. 7,639,909, FIG. 11, may be plotted.

As shown and disclosed in U.S. Pat. No. 7,639,909, the light beams projected into the optic fiber with an incident angle $\theta_n$ within the numerical aperture $\theta_{max}$ propagate with orbital angular momentum in a helical path in the direction of the longitudinal axis of the optic fiber.

According to the disclosed inventive principles, a plurality of light beams in separate respective channels, are projected or inserted into an optic fiber at opposite angles of incidence, within a numerical aperture $\theta_{max}$. The resultant light beams propagate with respective counter cyclical orbital angular momentum in respective helical paths in the longitudinal direction of the optic fiber. The resultant light beams, with opposite angles of incidence $\theta_n$, propagating with opposite angular momentum in counter rotating directions, clockwise and counterclockwise may occupy the same helical path but are counter cyclical with clockwise and counter clockwise orbital angular momentum and are non interfering, Where, as shown and disclosed, according to the disclosed inventive principles as shown for a preferred embodiment, and in a best mode, a plurality of separate respective light beams may be projected or inserted into an end of the optic fiber, with opposite angles of incidence or projection, for example as shown in a preferred embodiment, with same, or approximately the same, complementary angles of incidence.

The light beams may be projected into the fiber optic at respective points with the same or approximately the same displacement from the longitudinal axis of the optical fiber, for example, with respect to a locus describing a diameter of the optic fiber, or a locus describing a chord across the end of the optic fiber. As shown in a preferred embodiment, the light beams may be projected into the fiber optic a single coincident point.

However, the invention is not limited to the disclosed preferred embodiment but may be practiced, as shown herein, with a plurality of light beams projected or inserted into an optic fiber, with each respective light beam projected or inserted with a varying angle of incidence $\theta_n$ within a the numerical aperture $\theta_{max}$. Each of the projected light beams may be located at any selected random point on the end of the optic fiber and at any distance from any other of a plurality of projected light beams, relative to the locations where the other respective light beams are projected or inserted, into the fiber optic.

Projection of the light beams with opposed or opposite angles of incidence, for example $\theta_1$ and $\theta_2$ each within the maximum numerical aperture $\theta_{max}$, will cause the respective light will beams to propagate in the longitudinal axis direction of fiber optic, with respective counter cyclical orbital angular momentum (OAM) in a helical path.

As would be understood by those skilled in the art, by opposed or opposite angles of incidence is meant angles with opposed or opposite slopes.

The projections of the respective light beams, propagating in counter cyclical helical paths projected on a two dimensional plane, will produce light patterns in respective annular rings, with respective ring radii, as would be understood by those skilled in the art. Where the incident angles are opposite and approximately complementary, for example, the respective ring radii will be approximately the same.

As would be understood by those skilled in the art, an X, Y coordinate system for the end of the optic fiber, may be at any referenced location for an X axis and Y axis, on a circumference locus described by $2\pi r$, where r is any radial distance from the Z axis, or longitudinal axis, of the fiber optic end, to a maximum radius for a fiber optic.

According to the principals of the disclosed invention, and for a preferred embodiment shown in a best mode, where the respective light beams, are projected into the optic fiber at approximately opposite and complementary angles, for example $\theta_1$ and $\theta_2$, at opposed locations separated by the longitudinal or Z axis of the fiber optic, the respective light beams propagate in two optical channels describing similar countercyclical rotating helical paths inside the optic fiber with opposite, orbital angular momentum (OAM) and will project light in annular rings of approximately the same radii.

According to the disclosed inventive principles, two light beams at the same wavelength with opposite orbital angular momentum, clockwise and counter clockwise, can be simultaneously transmitted in the direction of the optic channel longitudinal or Z axis of the optic fiber, without interference, as shown and taught, according to the disclosed inventive principles.

At the output of the fiber optic, the respective light beams, with counter cyclical orbital angular momentum, propagate the same or similar set of X and Y coordinates, relative to a referenced X and Y coordinate system established at the input and output end planes of the optical fiber. The two countercyclical light beams may be projected on a projection plane or on a two dimensional surface, relative to the same X and Y coordinates.

As shown and described, according to the disclosed inventive principles, the projected radial displacement or radii of the respective annular rings will depend on the light beam projection variables, for example, the selected location and the incidence angle, $\theta_1$ and $\theta_2$, at which the respective light beams are projected or inserted in the input end of the fiber optic. In a preferred embodiment, to preserve bandwidth, the countercyclical light beams may be projected into a fiber optic with opposite or complementary angles and at opposed locations relative to the X, Y, Z, axis so the helical propagation of the two counter cyclical light beams are with the same helical radius and the annular projections of the two countercyclical light beams have the same annular radius.

According to the disclosed inventive principles and as shown for a preferred embodiment, the two respective light channels with counter cyclical orbital momentum, (OAM), in the clockwise and counterclockwise, directions, are non interfering, which may be separately verified, by using the opposite OAM of each light beam in a novel detector as shown and described according to the disclosed inventive principals and in a preferred embodiment.

As shown by the disclosed inventive principles and as shown in preferred embodiment, a plurality of counter cyclical helically propagating light beams, with opposite orbital angular momentum (OAM), from a plurality of light beams projected into a fiber optic with complementary or opposite angles of incidence and at opposed locations, projecting annular rings with the same radii, may be separately detected by an annular detector with light responsive elements in the orbital or rotating paths of light beams.

As shown for a preferred embodiment, detection may be by interfering with the counter cyclical propagating light beams helically projected in respective rotational directions and detecting the change in the response of the light responsive elements at selected locations subject to interference to the respective counter cyclical light beams.

DESCRIPTION OF THE PREFERRED EMBODIMENT

Figure 1:
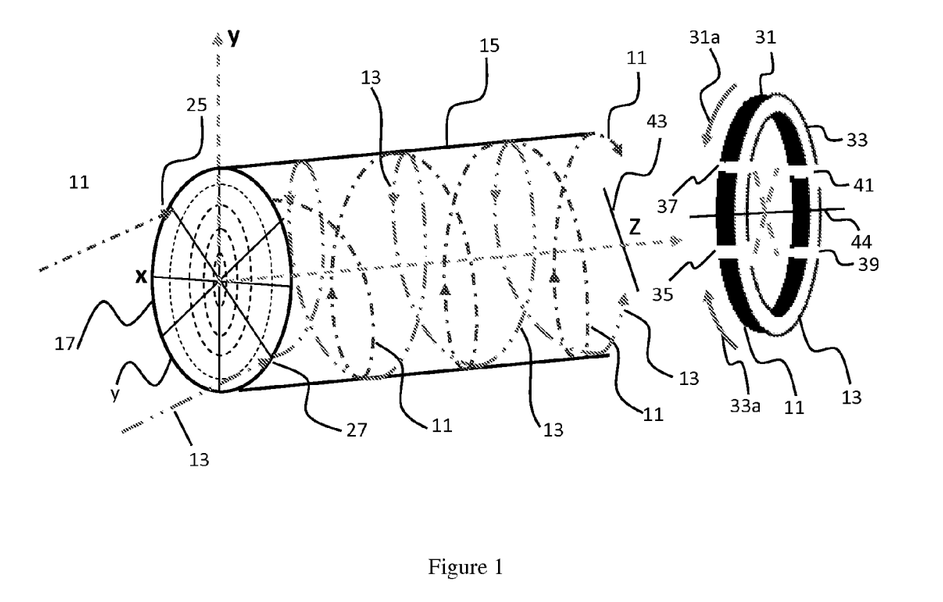
FIG. 1 shows in schematic form, projecting two light beams into the planar end of a fiber optic, at opposite launch angles and generating two contra cyclical light beams, propagating in the Z or longitudinal axis of the fiber optic with opposite orbital angular momentum.
Figure 1A:
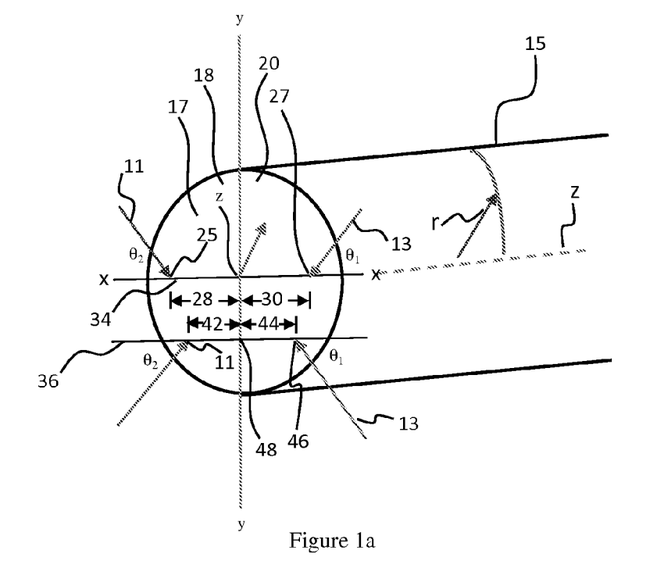
FIG. 1a shown in schematic form the insertion or of separate light beams, as shown in FIG. 1, at approximately complementary angles $\theta_1$ and $\theta_2$, at opposed locations at the fiber optic end, shown as a plane.

According to the disclosed inventive principles, and in a preferred embodiment, as shown in FIG. 1 and FIG. 1a, two light beams 11 and 13 are projected, into an optic fiber 15 at respective opposite or opposed angles of incidence $\theta_1$, $\theta_2$, with respect to the longitudinal Z axis of the optic fiber and points 25, 27, on a locus at end 17, shown in a preferred embodiment as a planar end.

By opposed or opposite angles is understood to mean angles $\theta_1$, $\theta_2$ with opposite slopes. The planar end 17 of the optic fiber end is shown and described by planar coordinate axes X and Y and by fiber optic longitudinal axis Z along the axis of the optic fiber 15. As would be known to those skilled in the art, and as shown in FIG. 1, the X and Y axes may be rotated about the Z axis, to any referenced position, on a circumferential locus described by $2\pi r$, where r is any radial distance from the center or z axis of the fiber optic.

For reference purposes only, the fiber optic 15 is shown with a first section 18 and a second section 20, disposed on opposite sides and separated by the longitudinal Z axis. As shown in a preferred embodiment, the first section 18 and second section 20, are separated by, and are on opposite sides of, the Y-Z plane, as shown in FIGS. 1 and 1a.

As shown and described, according to the disclosed principles of the invention, the random selected locations for inserting or projecting the opposed light beams into the fiber optic 15 may be in the same section, for example section 18, or in opposed sections 18 and 20, or at locations displaced at different displacements from the longitudinal Z axis of the fiber optic 15 or displaced with the same displacement from the fiber optic 15 longitudinal axis.

The terms as used herein, namely point, or location, or selected location, or random location, or random selected location, or selected random location, or selected point, or random point, or random selected point, or selected random point, is meant the location of the point or points, on the fiber optic at which the light beams are projected or inserted, into the fiber optic.

Figure 1B:
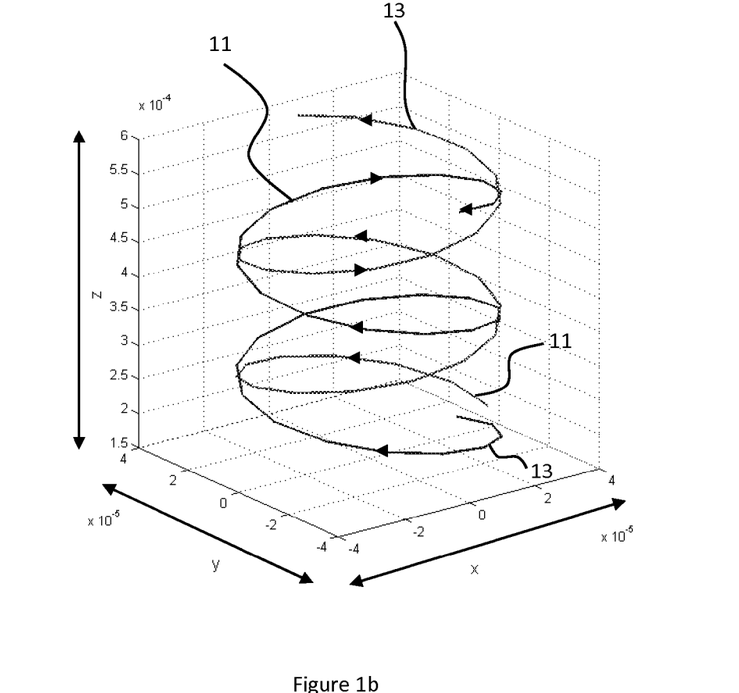
FIG. 1b shows in schematic form the two countercyclical light beams with opposed orbital angular momentum, propagating in a helical path in the direction of the Z or longitudinal axis of the fiber optic, and in counter clockwise and clockwise, directions

The helical paths of light beams 11 and 13, with counter cyclical orbital angular momentum, are shown in FIG. 1, in the fiber optic 15 and in FIG. 1b, superposed on an X axis, Y axis and Z axis coordinate system.

According to the disclosed inventive principles, for a preferred embodiment, as shown in FIG. 1 and FIG. 1a, two light beams 11 and 13 are projected, into, and intersect with the fiber optic 15 at two opposed points 25, 27, on a reference fiber optic 15, first locus 34, shown in a preferred embodiment as the X axis. The beams 11 and 13 are inserted or projected or injected, into the optic fiber planar end 13, at opposite angles and as shown in a preferred embodiment, as complementary or approximately complementary angles, $\theta_1$, and $\theta_2$. According to the inventive principles and in a preferred embodiment, the angles may be at, or approximately at opposite angles $\theta_1$, and $\theta_2$ for example, for light beam 13 and 11, respectively.

As shown by the disclosed inventive principles, the projection of the incident light beams, for example 11 and 13, may be at selected random locations, as shown for example in FIGS. 1e, 1f, 1g, and 1h.

FIG. 1b, shows the two light beams 13 and 11, may be projected to a on a second locus 36 at locations 46 and 38, respectively. As shown in a preferred embodiment, the second locus 36 may be a chord parallel to, or at a 0° angle to the referenced X axis. However, as would be understood by those skilled in the art, the locus of the chord 36 or the diameter 34 may be at any rotational angle with reference to the X axis, at the fiber optic, end 17 and the incidence angles for $\theta_1$, and $\theta_2$, may be any selected angles within the maximum aperture $\theta_{max}$.

Projection of light beams 13 and 11, into the planar end 17 of the optic fiber 15, at opposed or opposite incidence angles $\theta_1$, and $\theta_2$, for example, to points 25, 27, as shown on first locus 34, causes the light beams 13 and 11 to propagate in two contra cyclical or counter rotating cyclical light beams, respectively, propagating helically in the respective light beam paths shown as respective paths 13 and 11, each light beam with opposite orbital angular momentum, and each light beam 11 and 13 propagating along the optic fiber longitudinal Z axis to the opposite end 29 of the fiber optic 15, as shown where the light beams 13 and 11 are projected in two annular rings, as shown schematically, by numerals 33 for light bean 13 and 31 for light beam 11.

As shown in a preferred embodiment, in FIG. 1a, the light beams 11 and 13 are inserted or projected into end 17 of fiber optic 15 on a locus shown as the X axis 34 or along a locus describing a chord 36, and at points opposed across, and separated by, the longitudinal Z axis.

The locations of the points where the light beams 11 and 13, shown in a preferred embodiment at points 25, 27 and 38, 46, and the angles of injection, $\theta_1$, and $\theta_2$, may be varied without departing from the disclosed inventive principles.

In accordance with the disclosed inventive principles, projection of a plurality of light beams, into the fiber optic with opposite incidence angles, each within the numerical aperture $\theta_{max}$, will produce countercyclical rotating light beams opposite orbital angular momentum (OAM) propagating in the direction of the optical axis of the fiber optic. Varying the incident angle $\theta_n$, for example by increasing it up to the numerical aperture $\theta_{max}$ will produce projected annular rings, 33 and 31 with increasing radii. Varying the points where the light beams are projected into the fiber optic, for example, displaced away from the longitudinal axis of the fiber optic will produce projected annular rings 31, 33 with increasing radii.

As shown for a preferred embodiment, the light beams 11 and 13 are inserted or projected into the optic fiber end at points opposed across, and separated by the longitudinal Z axis and in respective separate parts 18 and 20, of the fiber optic 15 shown in a preferred embodiment as separated by the Y-Z plane, as shown in FIG. 1 and FIG. 1a. However, as would be understood by those skilled in the art, the projected light beams may be inserted into the fiber optic 15, in the same part of the fiber optic, for example in part 18 or in part 19, or at the same point, as shown in FIG. 1e or at selected random points as shown in FIGS. 1f, 1g, 1h, and the invention is not limited to the selected random insertion points, shown as examples, in FIGS. 1a, 1c, 1d, 1e, 1f, 1g.

Figure 1C:
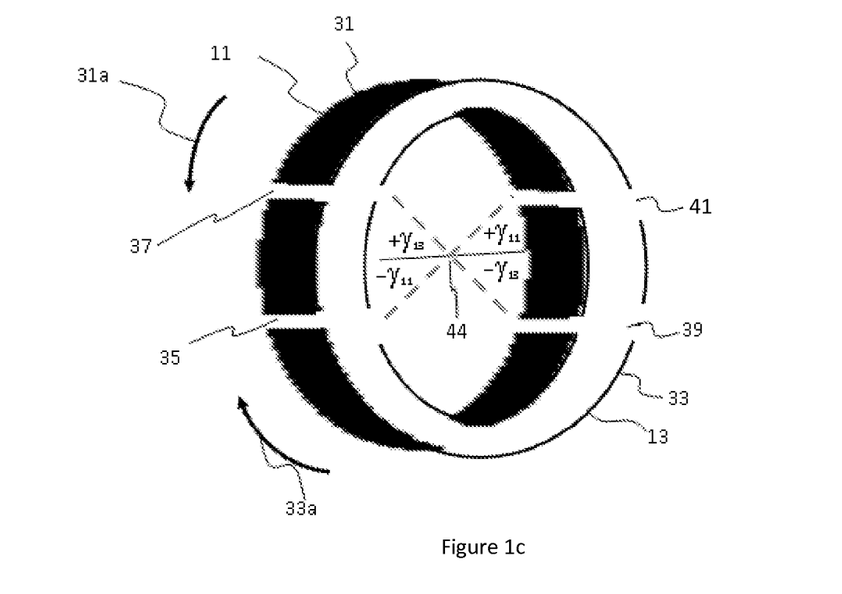
FIG. 1c shows in schematic form the projections of the two countercyclical light beams on a two dimensional surface, as shown in FIG. 1, with opposed orbital angular momentum, and showing the skew angles of the shadows produced in the projected annular rings by an interfering object shown as a wire place to interfere with the projection light path and as projected with the annular rings, parallel to the referenced object or the X axis of the fiber optic.
Figure 1D:
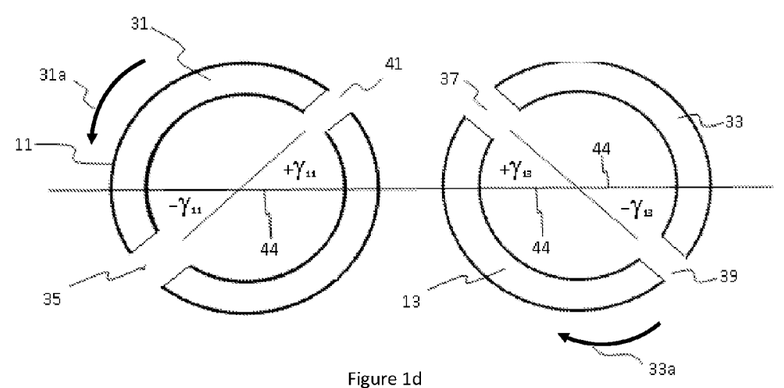
FIG. 1d shows in an exploded view, the separate projections of the two countercyclical light beams with opposed orbital angular momentum, as shown in FIGS. 1 and 1c, as two annular rings with the respective shadows cast by an interfering object shown as a wire across the X axis of fiber optic, and with the shadows shown in each projected annular ring shown rotated from the projected X axis of the fiber optic or the spatial projection of the interfering object, on the two dimensional surface, by equal and opposite skew angles $[\pm\gamma_{11}, \pm\gamma_{13}]$.
Figure 1E:
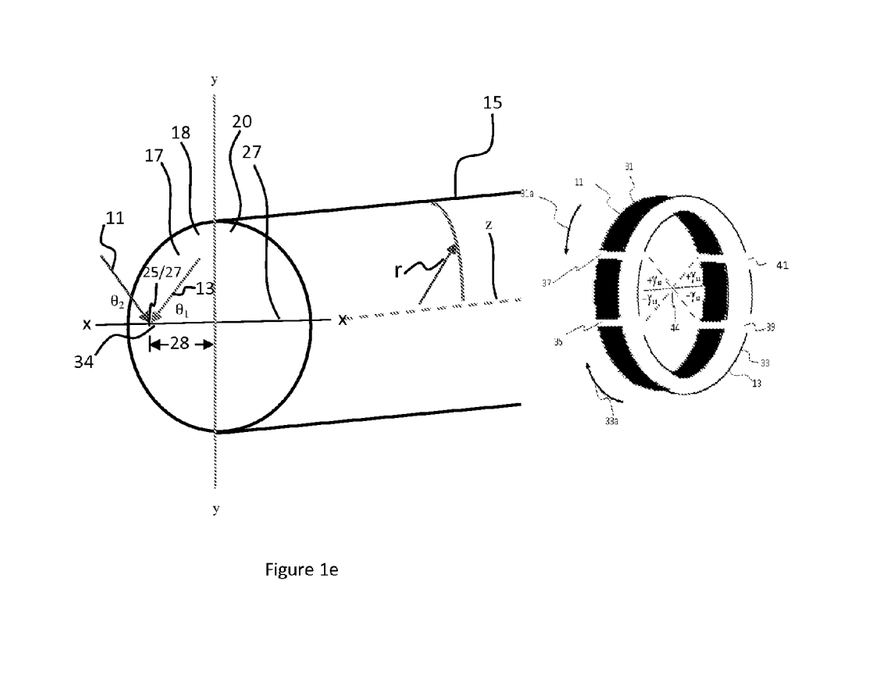
FIG. 1e shows in schematic form, two light beams, for example the light beams, projected into end of the fiber optic at the same random coincident location and at a selected opposite incidence angles $\theta_1$, $\theta_2$, to produce counter cyclical helically propagating light beam with opposite OAM, and annular ring projections of the light beams, with the same radii.
Figure 2:
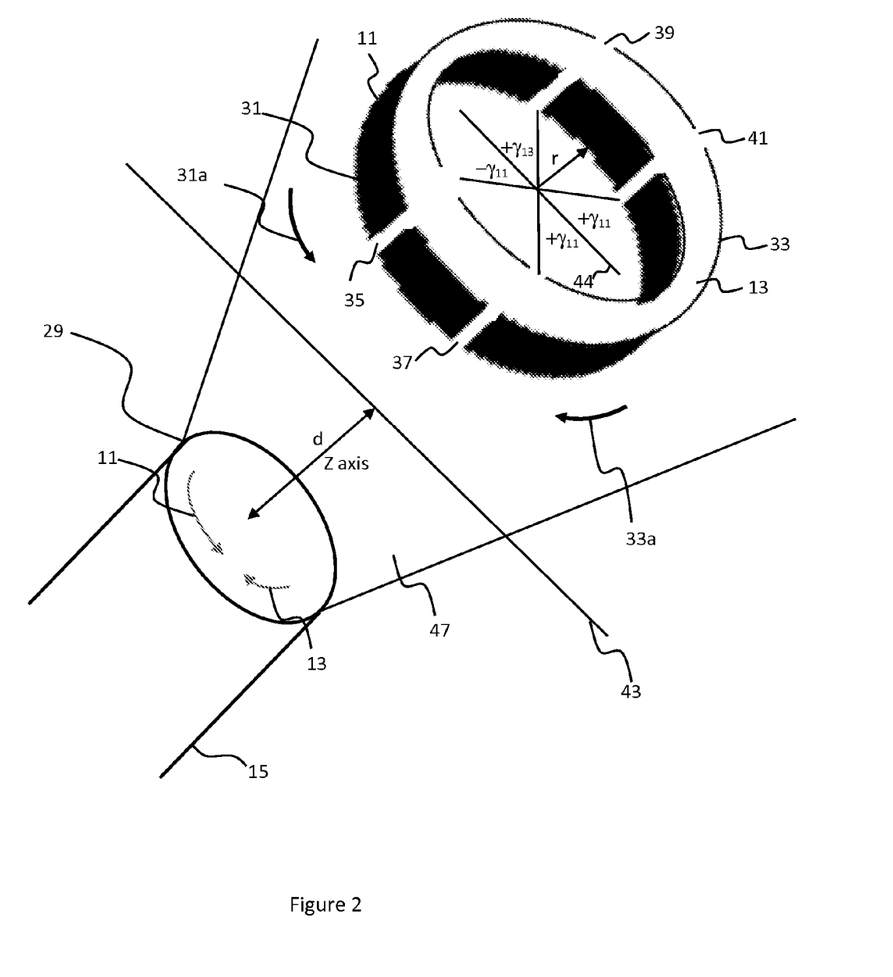
FIG. 2 shows, in schematic form, the projection of the two contra cyclical light beams, as shown in FIGS. 1, 1c, and 1d, on a two dimensional surface with the respective shadows produced by an interfering object, shown as a wire across the X axis of fiber optic, with the shadow shown rotated from the projected X axis of the wire, on the two dimensional surface, by equal and opposite skew angles $[\pm\gamma_{11}, \pm\gamma_{13}]$.

The projection of the two counter rotating light beams 11 and 13, with respective counter rotating orbital angular momentum, from fiber optic end 29 onto a two dimensional surface, is shown schematically in FIGS. 1, 1c, 1d in an exploded view and in FIG. 2, by annular ring projections shown by 33 for light beam 13 and 31 for light beam 11.

The counter cyclical orbital angular directions, clockwise and counterclockwise, of the annular ring projections 31 and 33, is as shown schematically by the counterclockwise arrow 31a for annular projection 31 for light beam 11 and clockwise arrow 33a for annular projection 33 for light beam 13.

Figure 1F:
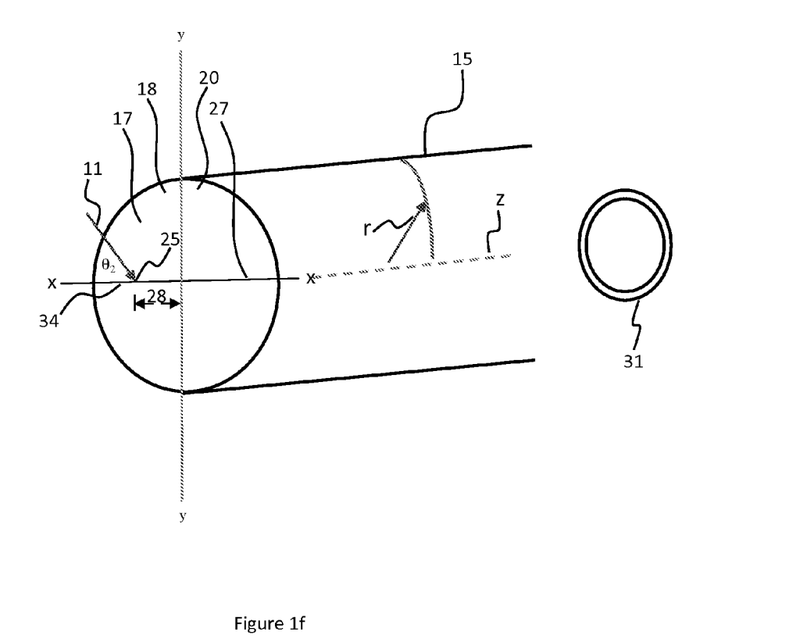
FIG. 1f shows in schematic form, a single light beam projected into the end of the fiber optic at a selected random location and at a selected incidence angle $\theta_2$ to produce a cyclical helically propagating light beam with OAM, and an annular ring projection of the light beam.
Figure 1G:
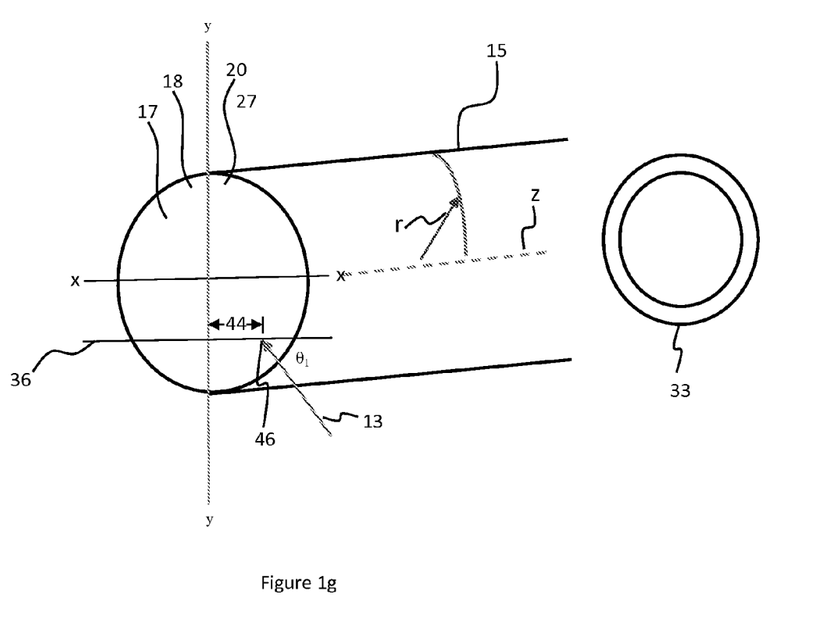
FIG. 1g shows in schematic form, a single light beam projected into the end of the fiber optic at a selected random location and at a selected incidence angle $\theta_1$, to produce a cyclical helically propagating light beam with OAM, and an annular ring projection of the light beam.
Figure 1H:
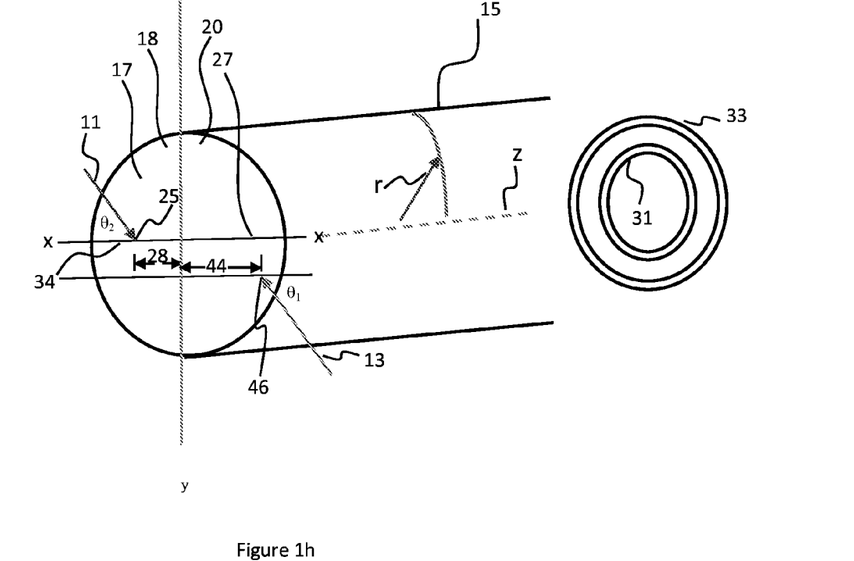
FIG. 1h shows in schematic form, two light beams, for example the light beans as shown in FIG. 1f and FIG. 1g, projected into end of the fiber optic at a random selected locations and selected opposite incidence angles $\theta_1$, $\theta_2$, to produce cyclical helically propagating light beam with opposite OAM, and annular ring projections of the light beams with respective radii.

The radius of the annular light projections, shown for example, in FIGS. 1, 1c, 1d, and 2, as annular ring projections 33 and 31, in the contra cyclical directions, shown arrows 31a and 33a, may be varied according to the disclosed inventive principles, by varying the selected projection angles $\theta_1$, and $\theta_2$ and the selected insertion or projection points, for the light beams, as shown for example, in a preferred embodiment as selected locations 25 and 27, on first locus 34, or the locations 38 and 46, on second locus 36, or as shown, for example, by the projection of annular rings 31 and 33, produced by the insertion of light beam 11 at selected random insertion point 25, and beam 13 at selected random insertion point 46, as shown in FIGS. 1f, 1g, 1h, and as would be understood by those skilled in the art, the principles of the invention include all selected random point for the insertion of the light beams, for example 11 and 13, in any X, Y, coordinate position.

As shown in FIGS. 1, 1c, and 1d, shadows 35, 37, 39 and 41 are shown n the annular ring projections 31 and 33, as would be projected by an interfering object, for example, wire 43 placed in the light path of projected light beams 11 an 13, as shown in FIG. 2.

As shown in FIGS. 1, 1c, 1d, and 2, where the interfering wire object, shown as wire 43 is located on a locus opposed to the fiber optic end 29, and parallel to the X axis, the shadows 35, 41, are shown on annular ring projection 31 and shadows 37, 39, are shown on annular ring projection 33.

As shown in FIGS. 1c and 1d, showing in schematic form, the annular right projections 31 and 33 are in the counter cyclical orbital directions of rotation 31a and 33a. The shadows projected by the wire 43, as shown in FIG. 1, located on the X axis of the fiber optic 15, on annular ring 31, for beam 11 and on annular ring 33 for beam 13, are displaced at opposite respective skew angles $\pm\gamma_{13}$, and $\pm\gamma_{11}$, from a locus 44, on the projection plane for the annular rings 31 and 33, opposed to and parallel to the spatial projection of the X axis of the fiber optic 15, or the wire 43.

As would be understood by those skilled in the art, the angles $\theta_1$, and $\theta_2$ may be varied without departing from the principles of the invention and the point of projection into the optic fiber end 17, shown as 25, 27 or 36, 46, in FIG. 1 and FIG. 1a, may be varied without departing from the principles of the invention FIG. 1e shows in schematic form, two light beams, for example the light beams 11 and 13, projected into end of the fiber optic at the same random locations 25, 27, and at selected opposite incidence angles $\theta_1$, $\theta_2$, to produce counter cyclical helically propagating light beam with opposite OAM, and annular ring projections of the light beams, with the same radii.

FIG. 1f shows in schematic form, a single light beam 11, projected into the end 17 of the fiber optic at a random location 25 and at a selected incidence angle $\theta_2$ to produce a cyclical helically propagating light beam with OAM, and an annular ring projection 31 of the light beam.

FIG. 1g shows in schematic form, a single light beam 13, projected into the end of the fiber optic at a random location 46, and at a selected incidence angle $\theta_1$, to produce a cyclical helically propagating light beam with OAM, and an annular ring projection 33, of the light beam.

FIG. 1h shows in schematic form, two light beams, 11, 13, for example the light beams, as shown in FIG. 1f and FIG. 1g, projected into end 17, of the fiber optic at a random locations 46 and 34, and at a selected opposite incidence angles $\theta_1$, $\theta_2$, to produce cyclical helically propagating light beam with opposite OAM, and annular ring projections of the light beams with respective radii.

The projection of the shadow pairs 35, 41, for annular ring 31 and 37, 39 for annular ring 33, at respective opposite skew angles $\pm\gamma_{13}$, $\pm\gamma_{11}$, as shown schematically in FIGS. 1c and 1d, is the result of the counter cyclical orbital angular momentum of the light beams 11 and 13, as explained herein.

As shown in a preferred embodiment, a interfering object, shown as a wire 43 placed in the projection path 42 of the counter cyclical light beams 11 and 13, produces respective shadows 35, 41, 37, 39, in the projected annular rings 31 and 33. With respect to the spatial projection of the interfering wire 43, the shadows 37, 39 and 35, 41, are angularly displaced in the projection plane of the annular rings 31 and 33, from the spatial projection of the interfering wire 43 or, for example, the X axis.

As shown schematically in FIGS. 1c and 1d, for beam 11 shown with orbital angular momentum in the counter clockwise direction 31a, shadows 35, 41, will be produced at skew angles $\pm\gamma_{11}$ and for beam 13 shown with clockwise orbital momentum 33a, in the clockwise direction will be produced at skew angles, $\pm\gamma_{13}$. As may be seen in FIG. 1d, showing schematically an exploded view of the annular rings 31 and 33 the skew angles $\pm\gamma_{11}$ are shown for annular ring 31 and skew angles $\pm\gamma_{13}$ are shown for annular ring 33.

By annular ring 31 and annular ring 33, as would be understood by those skilled in the art, is meant the annular ring projection of light on a projection plane by respective counter cyclical rotating light beams 11 and 13, each with opposite orbital angular momentum.

As shown in FIG. 1a, the fiber optic 15, with a radius r, is shown with an input end 17, where light beams 11 and 13 are projected into the fiber optic 15. As shown schematically, according to the inventive principles, and in a preferred embodiment, light beam 11 is projected into fiber optic end 17 on the locus 34 describing the diameter of the fiber optic 15, which may be or may not be, parallel to an established X axis. Increasing or decreasing the insertion angles $\theta_1$, $\theta_2$, and will decrease or increase the radius of the projected annular rings 33 and 31.

Moving the points of insertion 25 and 27, or 38, 46, closer to, or further from the longitudinal or Z axis, will decrease or increase the radius of the projected annular rings 33 and 31. Accordingly the function and result of the disclosed invention and the way the function and result of the disclosed invention may be achieved, may be by varying the insertion angles $\theta_1$, and $\theta_2$, the location of the locus on the end 17 where the light beams are projected into the fiber optic 15, the location of the points on the locus where the light beams, for example 11 and 13, are projected into the fiber optic 15, whether the locus for inserting the light beams is on the X axis of end 17, or at a location displaced from the X axis, or the relative displacement of the points of insertion from the longitudinal Z axis, where the light beams are inserted.

As shown in FIG. 2, in a perspective schematic view, according to the disclosed inventive principles and in a preferred embodiment, an interfering object shown as a wire 43 is placed opposed to the output end 29 of the fiber optic 15, and in a preferred embodiment, opposed to the X axis of the fiber optic 15, displaced from end 29 and in the projection path 47 of the contra cyclical rotating light beams 11 and 13, by a distance d. The projection of the contra cyclical light beam 11 and 13, for example on a two dimensional surface, is shown schematically in FIGS. 1, 1c, 1d and 2, by the superposed rings shown schematically at rings 31, 33, in FIG. 2, and separately in an exploded view in FIG. 1d. As shown, shadows 35 and 41, made in annular ring 31, by the projection of light beam 11, across the interfering wire 43, shown schematically with counter clockwise orbital angular momentum 31a, on the wire 43 are displaced by equal and opposite skew angles $\pm\gamma_{11}$, from the spatial projection of wire 43 on the two dimensional plane of projection shown by annular ring 33, relative to a line 44, parallel to and opposed to the wire 43.

Similarly, as shown, shadows 39, 37, made in annular ring 33 by the projection of light beam 13, shown schematically with clockwise orbital angular momentum 33a, on interfering wire 43, are displaced by opposite skew angles $\pm\gamma_{13}$, from the spatial projection of wire 43 on the plane of projection shown by annular ring 33, relative to a line 44, parallel to and opposed to the wire 43 or the spatial projection of the X axis of end 17.

As shown herein, in a preferred embodiment, the ability to transmit two optical vortices in two (2) channels with the same orbital angular momentum but with opposite topological charge and with counter cyclical rotational directions, inside a single fiber simultaneously while preserving each light beam's orbital angular momentum and countercyclical rotational direction, permits simultaneous transmission of two optical channels at the same spatial location by using separate respective orbital angular momentum, in conjunction with intensity of light to detect signals instead of the conventional methods of employing intensity alone to detect the presence or absence of a signal.

Figure 3:
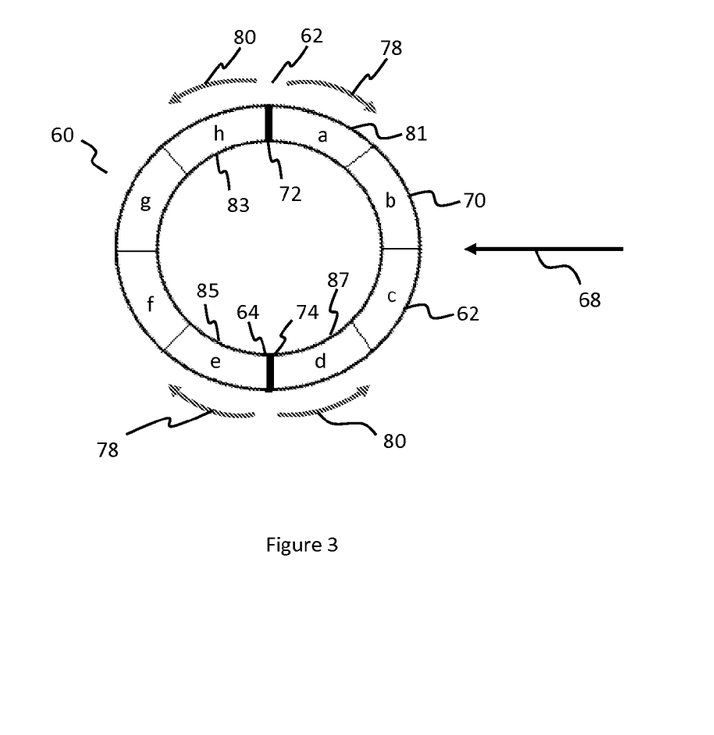
FIG. 3 shows in schematic form, a detector for detecting each of two countercyclical rotating light beams, as shown in FIGS. 1, 1c, and 1d.
Figure 3A:
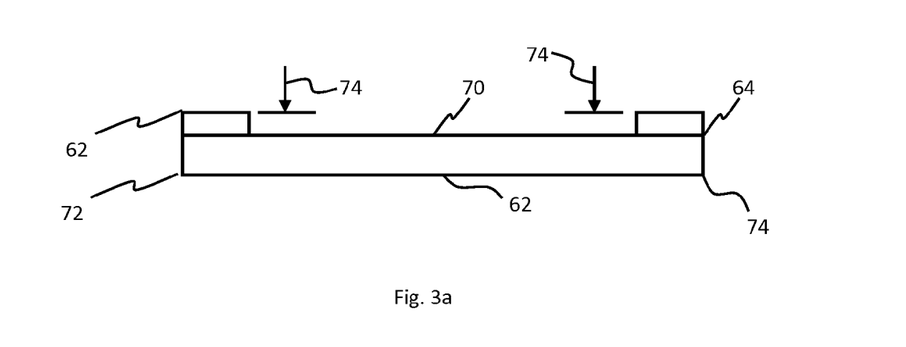
FIG. 3a is a schematic view, shows the detector shown in FIG. 3, in a side view.
Figure 3B:
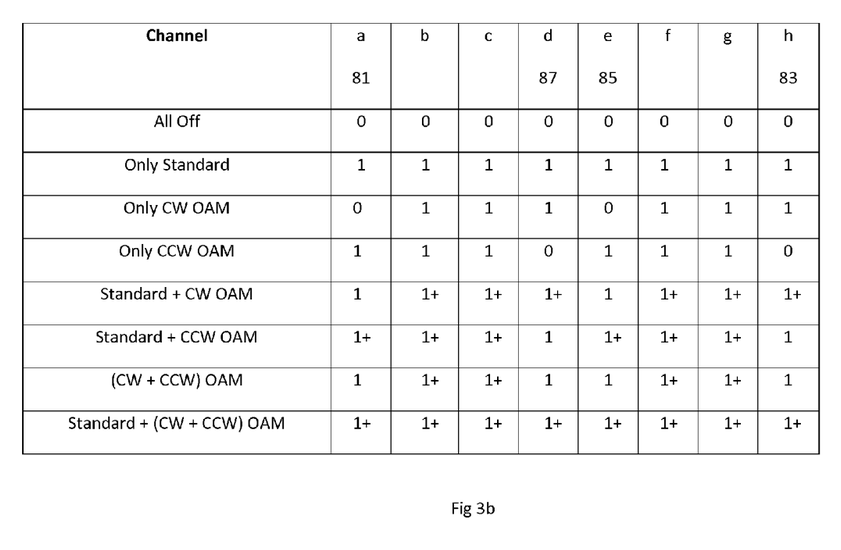
FIG. 3b is the truth table logic diagram showing how the signals produced from each of detector segments as shown in FIG. 3, may logically be used to separately detect the counter rotating beams, each with opposite orbital angular momentum, projected with the projections of a standard beam without orbital angular momentum.

An orbital angular detector which may be used to detect the counter rotating orbital angular light beams, 11 and 13, as shown in FIGS. 3, 3a and 3b, where the projected respective annular rings 31, 33, are projected with the same radii.

A segmented photo-detector, shown generally by numeral 60 with a planar body 62, and two opposed ridges 62 and 64. The ridges 64, 66, are shown in a side view in the direction of arrow 68, as light interfering structures arranged on the surface 70, of photo detector 62, at opposed diametric points 72, 74, or 180° from each other.

The photo detector 60 is used to detect the information associated with one standard light beam in one optical channel without orbital angular momentum and two light beams 13, 11 in two other respective light channels with counter orbital angular momentum, possessing clockwise and counter clockwise orbital angular momentum, with reference to the truth table shown in FIG. 3b.

In a preferred embodiment, according to the disclosed inventive principles, a segmented annular photo detector 60 is as shown in FIG. 3. The photo detector 60, is shown with segmented light responsive elements, for example photo diodes, as would be known to those skilled in the art, a, b, c, d, e, f, g, h, arranged on the annular photo detector surface 70. Two ridges 64 and 66 are shown on the surface 70 of the photo detector 60, as shown in FIG. 3a, showing a side view of detector 60, from the direction of arrow 68 and arranged to interfere with the rotating light beams 11 and 13, projected toward the ridge 62 and 64, as shown by arrows 80 for light beam 11 or projected toward the ridge 62 and 64, and as shown by arrows 78 for light beam 13.

As shown in a preferred embodiment, the photo diode detector may be divided, for example, into six or more segments, such that four segments 81, 83, 85, 87, shown adjacent to the ridges 62 and 64, and two or more segments, b, c, g, h, displaced from the ridges 62. 64.

As shown for a preferred embodiment, for two of the adjacent segments (a & e) (81, 85) adjacent to the ridges 62, 64, the ridges 62, 64 will interfere with the clockwise (CW) light beam 13, while for the two adjacent segments (h & d) (83, 87), adjacent ridges 62, 64, the ridges 62, 64, will interfere with the counterclockwise (CCW) light beam 11.

The interference by ridges 62 and 64, with the light beams 11 and 13, will reduce the light on photo detector segments 83, 87 and 81, 85, respectively. This will lead to a reduced light intensity on the respective adjacent segments as compared to the standard segments, for example, as shown in a preferred embodiment, segments f, g, b and c, which are not adjacent the ridges 62, 64.

Comparator circuits or other logic circuits can then be used to detect the presence or absence, or relative intensity, of one or both light beam channels and to detect the intensity of a standard light beam which is without orbital angular momentum, as would be known to those skilled in the art. As known to those skilled in the art, the comparator circuits would compare the relative electrical signals produced by the relative intensity of light on photo detectors a –h, to produce signals indicative of the relative light intensity on the respective photo detectors, as from the light beam 11 or 13 or from a standard light beam. The signals, reproduced in a logical truth table as shown in FIG. 3b, would indicate the presence or absence of the standard non rotating light bean, or the clockwise or counter clockwise, rotating light beams.

The truth table is presented in FIG. 3b, shows how the photo detector 60 with segmented detectors and opposed ridges 62, 64, can be used to simultaneously detect the transmitted light in three light beams or channels, where one light beam is a standard light beam and two light beams are counter cyclical light beams with opposite orbital angular momentum.

As shown in FIG. 3b, the light beams or channels, shown as Only Standard, Only CW OAM (Clockwise Orbital Angular Momentum), Only CCW OAM (Counter Clockwise Orbital Angular Momentum), Standard+CW OAM, Standard+CCW OAM, (CW+CCW) OAM, and Standard+(CW+CCW) OAM, produces the signals shown in FIG. 3b, for the photo detectors a to h and 81, 83, 85, 87, For example, a "0" signal indicates no light or reduced light on the respective photo detector, for example as a result of ridge 62 or 64, interfering with rotating light beam 11 or 13, a "1" indicates full light from one light beam on the respective photo detector and a "1+" indicates light from two (2) light beams on a respective photo detector, for example from the standard light channel and from the CC or CCW light beams 11 or 13, where the light falls on the photo detector without interference from ridge 62 or 64.

As would be known to those skilled in the art, and as explained for a preferred embodiment, the detector 60 detect the counter cyclical light beams, as shown for a preferred embodiment, beam 11 and 13, with one ridge, for example ridge 62 and adjacent light detector segments (81, a) and (83, h) and as shown in the truth table columns a, 81 and h, 83, in FIG. 3b.

As would be understood by those skilled in the art, the structure and arrangement shown for the preferred embodiment may be altered without departing from the disclosed inventive principles.

The invention claimed is:

1. A system of optical communication using light beams with counter cyclical orbital angular momentum, comprising,
   a light conductor; a numerical aperture within said light conductor;
   at least a first light beam projected into said light conductor at a first point and at a first angle of incidence within said numerical aperture;
   at least a second light beam projected into said light conductor at a second point at a second angle of incidence within said numerical aperture; said first angle of incidence and said second angle of incidence are opposed angles; and
   wherein said first light beam and said second light beam, propagate in said light conductor with opposite orbital angular momentum.

2. The system of optical communication of claim 1, including a longitudinal axis in said light conductor; and wherein said first point and said second point are displaced from said longitudinal axis; and said first light beam and said second light beam, propagate helically in the direction of the longitudinal axis in separate light beam paths.

3. The system of claim 1, wherein said first angle of incidence and said second angle of incidence, are approximately complementary.

4. The system of claim 1, wherein said first point and said second point are coincident points.

5. The system of claim 1, including a longitudinal axis in said light conductor and wherein said light conductor first point and said second point are disposed at approximately the same distance from said longitudinal axis.

6. The system of claim 1, including a longitudinal axis in said light conductor; and wherein, said first point and said second point are disposed on a first locus through said longitudinal axis or on a second locus displaced from said first locus; and said first point and said second point on said first locus are displaced at approximately the same distance from said longitudinal axis, or said first point and said second point on said second locus, are displaced at approximately the same distance from said longitudinal axis.

7. The system of claim 1, wherein said light conductor has a second end, opposed to said first end; and wherein said second end is adapted to project said first light beam in a first annular projection and said second end is adapted to project said second light beam in a second annular projection.

8. The system of claim 7, including a projection plane; a first object placed between said second end and said projection plane, to interfere with said first light beam and said second light beam; said first object projecting a first shadow on said projection plane from said first light beam at first skew angles $+\gamma_1$ or $-\gamma_1$, and said first object projecting a second shadow on said projection plane from said second light beam at second skew angles $+\gamma_2$ or $-\gamma_2$.

9. The system of claim 8, wherein said first skew angles $+\gamma_1$ or $-\gamma_1$, are opposite angles between said first shadow and the projection on said projection plane of said first object and said second skew angles $+\gamma_2$ or $-\gamma_2$, are opposite angles between said second shadow and the projection on said projection plane of said first object.

10. The system of claim 7, wherein the radius of said first annular projection varies in relation to said first angle of incidence or in relation to said first point and the radius of said second annular projection varies in relation to said second angle of incidence or in relation to said second point.

11. The system of claim 1, including a longitudinal axis in said light conductor; and wherein said first point and said second point are disposed at separate respective distances from said longitudinal axis.

12. The system of claim 8, including an annular detector in said projection plane; said annular detector including a plurality of light responsive segments; arranged on the surface of said annular detector; a first object arranged on said annular detector and located in the helical light path of said first light beam and said second light beam, whereby said first object interferes with said first light beam or said second light beam.

13. The system of claim 12, wherein said first light beam orbital angular momentum is in a counter clockwise rotational direction and said second light beam orbital momentum is in a clockwise rotational direction and said first object interferes with the light from said first light beam to reduce the light on at least a first of said plurality of light responsive segments and said first object interferes with the light from said second light beam to reduce the light on at least a second of plurality of light responsive segments.

14. The system of claim 13, wherein said first object is disposed between said at least a first of said plurality of light responsive elements and said at least a second of said plurality of light responsive elements.

15. A system for detecting rotating light beams with countercyclical clockwise and counterclockwise orbital angular momentum, comprising,
an annular detector; said annular detector including a plurality of light responsive segments arranged on said annular detector; a first object arranged on said annular detector, whereby said first object interferes with a first rotating light beam with counter clockwise orbital angular momentum and said first object interferes with said a second light beam with clockwise orbital angular momentum.

16. The system of claim 15, wherein said first object interferes with light from said first light beam to reduce the light on at least a first of said plurality of light responsive segments and said first object interferes with light from said second light beam to reduce the light on at least a second of plurality of light responsive segments.

17. The system of claim 16, wherein said first object is disposed between said at least a first of said plurality of light responsive elements and said at least a second of said plurality of light responsive elements.

18. A method of optical communication using light beams with counter cyclical orbital angular momentum, comprising the steps of, projecting, at least a first light beam and at least a second light beam, into a light conductor as a respective first point and at a respective second point; and wherein said step of projection includes the step of projecting said first light beam at a first angle of incidence and projecting said second light beam at a second angle of incidence and wherein first angle and said second angle are opposite angles producing counter cyclical light beams with opposite orbital angular momentum propagating helically in the direction of the longitudinal axis of said light conductor.

19. The method of claim 18 wherein said step of projecting said first light beam and said second light beam, in said light conductor, includes the step of projecting said first and second light beams with complementary angles of incidence.

20. The method of claim 19, wherein the step of projecting includes the step of projecting said first and second light beams at said first point and said second point, approximated equally disposed from said longitudinal axis.

* * * * *